United States Patent [19]

Litman

[11] Patent Number: 5,510,174
[45] Date of Patent: Apr. 23, 1996

[54] THERMALLY CONDUCTIVE MATERIALS CONTAINING TITANIUM DIBORIDE FILLER

[75] Inventor: Gary J. Litman, Framingham, Mass.

[73] Assignee: Chomerics, Inc., Woburn, Mass.

[21] Appl. No.: 226,450

[22] Filed: Apr. 12, 1994

Related U.S. Application Data

[63] Continuation of Ser. No. 91,700, Jul. 14, 1993, abandoned.

[51] Int. Cl.$^6$ .......................... B32B 27/12; B32B 15/08; B32B 27/20; B32B 27/30
[52] U.S. Cl. .......................... 428/261; 428/240; 428/242; 428/343; 428/344; 428/355; 428/356; 428/423.1; 428/425.6; 428/425.8; 428/425.9; 428/429; 428/441; 428/442; 428/447; 428/450; 428/461; 428/463; 428/522; 428/902; 524/404; 524/413
[58] Field of Search .................................... 428/343, 355, 428/423.1, 425.9, 902, 240, 242, 344, 356, 261, 425.6, 425.8, 429, 441, 442, 447, 450, 461, 463, 522; 524/404, 413

[56] References Cited

U.S. PATENT DOCUMENTS

| | | | |
|---|---|---|---|
| 4,151,547 | 4/1979 | Rhoades et al. | 357/81 |
| 4,466,483 | 8/1984 | Whitfield et al. | 165/185 |
| 4,490,283 | 12/1984 | Kleiner | 252/512 |
| 4,548,862 | 10/1985 | Hartman | 428/323 |
| 4,574,879 | 3/1986 | DeGree et al. | 165/185 |
| 4,654,754 | 3/1987 | Daszkowski | 361/388 |
| 4,666,545 | 5/1987 | DeGree et al. | 156/252 |
| 4,755,249 | 7/1988 | DeGree et al. | 156/252 |
| 4,853,763 | 8/1989 | DeGree et al. | 357/81 |
| 4,869,954 | 9/1989 | Squitieri | 428/283 |
| 4,888,247 | 12/1989 | Zweben et al. | 428/105 |
| 5,137,959 | 8/1992 | Block et al. | 524/430 |
| 5,194,480 | 3/1993 | Block et al. | 524/404 |

OTHER PUBLICATIONS

Application Update, "Shielding Tips", Chomerics, Inc. No. 66, Oct., 1987.
IBM Technical Disclosure Bulletin, "Heat Conducting Washer" vol. 8, No. 1, Jun., 1965.

*Primary Examiner*—D. S. Nakarani
*Attorney, Agent, or Firm*—Wolf, Greenfield & Sacks

[57] ABSTRACT

Titanium diboride ($TiB_2$) is used as a thermally conductive, filler in thermally conductive materials. The $TiB_2$ provides improved thermal conductivity in comparison to conventional thermally conductive, electrically insulative or thermally conductive electrically conductive fillers especially at low application pressures. The materials into which the $TiB_2$ filler is incorporated includes elastomers, films and tapes.

20 Claims, No Drawings

THERMALLY CONDUCTIVE MATERIALS CONTAINING TITANIUM DIBORIDE FILLER

This is a continuation of application Ser. No. 08/091,700, filed on Jul. 14, 1993, now abandoned.

This invention relates to thermally conductive materials, such as elastomers, films, tapes, and compounds such as adhesives and greases. Moreover, it relates to the use of titanium diboride as a thermally conductive filler in such materials.

BACKGROUND OF THE INVENTION

Thermally conductive materials include elastomeric materials such as CHO-THERM® thermal pads, films, such as KAPTON® MT thermally conductive polyimide film, tapes, such THERMATTACH® pressure sensitive acrylic tapes, and adhesives and greases, such as silicone grease, all of which contain a thermally conductive filler in a resin binder. They are primarily used in electronic applications where good thermal conduction is needed. For example, a thermally conductive material may be used as an interface between a heat source, such as semiconductor or other electronic component and a metal heat sink.

Many electronic designs and applications are limited by the ability to dissipate thermal energy generated during the operation of the electronic components. Many electronic components, especially semiconductor components, are prone to breakdown at high temperatures. Thus, the ability to dissipate heat is a limiting factor on the performance of the component.

Thermally conductive materials have been based upon the use of a binder, preferably a resin binder in particular a silicone, thermoplastic rubber, urethane or acrylic, into which one or more thermally conductive fillers have been distributed.

These fillers have typically been one of two major types: thermally conductive, electrically insulative or thermally conductive, electrically conductive fillers.

Aluminum oxide, magnesium oxide, zinc oxide, boron nitride and aluminum nitride are the most often cited types of thermally conductive, electrically insulative fillers used in thermal products. Aluminum, copper, graphite, nickel and silver are commonly cited examples of thermally conductive, electrically conductive fillers.

In using such materials, it is known that by applying pressure between the heat source and the heat sink, one is able to obtain higher apparent thermal conductivity from the thermal product which is located between the heat source and heat sink. Typically, pressures of up to 300 psi are used in order to obtain the maximum apparent thermal conductivity possible from the product.

What is desired is a thermally conductive filler with higher thermal properties. Moreover, it is desired to have a thermally conductive material which has satisfactory thermal properties at low or no applied pressures.

The present invention provides such a material.

SUMMARY OF THE INVENTION

The invention provides filled thermally conductive material of improved apparent thermal conductivity using titanium diboride as the filler.

In one aspect, the invention encompasses a thermally conductive filled elastomer composition comprising an elastomer such as silicone rubber, thermoplastic rubber or polyurethane, and titanium diboride as the thermally conductive filler.

In another aspect, the invention encompasses a thermally conductive filled plastic film comprising a composition of a plastic resin and titanium diboride as a filler.

In a further aspect, the invention relates to a pressure sensitive, thermally conductive tape composition of a pressure sensitive silicone, urethane or acrylic resin and titanium diboride filler.

In an additional aspect, the invention relates to a thermally conductive adhesive or grease formed of a resin binder and titanium diboride filler.

DETAILED DESCRIPTION OF THE INVENTION

The compositions of the invention generally comprise a resin binder and titanium diboride as a thermally conductive filler. The compositions can be formed into various configurations such as elastomeric pads, films, tapes, compounds, adhesives and greases.

Titanium diboride ($TiB_2$) is a thermally conductive material. It is not electrically insulative, as is alumina or boron nitride. However, its electrical conductivity is at least a magnitude of order below the traditional metal fillers, such as aluminum copper, nickel or silver. As such it is useful for most thermal applications, especially those applications where electrical insulation is not an absolute necessity.

Moreover, the literature has described titanium diboride as having poorer thermal properties than the traditional fillers such as alumina and boron nitride. Applicant has found that this material when in particulate form and distributed throughout a resin matrix has high levels of apparent thermal conductivity. It has been found that the level of apparent thermal conductivity of a resin matrix containing titanium diboride as a thermally conductive filler is better than a resin matrix made using alumina, boron nitride, aluminum, copper, or silicon carbide under applied pressure or at no applied pressure at all.

The resin binder to which the filler may be added includes silicones, urethanes, thermoplastic rubbers, acrylics and the like.

Silicone elastomers are preferably formed from a silicone gum which is crosslinked using a catalyst. An example of a suitable silicone gum is sold under the name "Silastic® 4-2765" by Dow Corning, Inc. A peroxide catalyst: 2,5-dimethyl 2,5-bis (t-butyl peroxy hexane 50% on $CaCO_3$ sold by R. T. Vanderbilt as Varox® DBPH-50 is an example of a suitable catalyst.

Preferred thermoplastic rubbers are typically thermoplastic blockpolymers such as Kraton® G-1657-MX (a styrene-ethylene-butylene-styrene block copolymer having a styrene/rubber ratio of 13/87) sold by Shell Chemical Co.

Preferred crosslinkable block copolymers are thermoplastic rubbers such as Kraton® G-1901-X and Kraton® RP-6501 sold by Shell Chemical Co. These rubbers are styrene/olefin based with functional groups. G-1901-X has carboxyl groups whereas RP-6501 has ethoxysilanol groups. In order to cause crosslinking, a crosslinking agent and a crosslinking catalyst are preferably combined with the crosslinkable copolymer. A preferred crosslinking agent is Cymel® 303 (hexamethoxymethylmelamine) sold by American Cyanamid. A preferred crosslinking catalyst for G-1901-X is Cycat® 600 (aromatic sulfonic acid) also sold by American Cyanamid. For RP-6501, dibutyl tin dilaurate is a preferred catalyst.

Preferred urethanes are polyurethane resins which are nonfoaming and capable of being crosslinked at elevated temperatures. Such systems are well known, such as from U.S. Pat. No. 4,869,954 which is incorporated by reference in its entirety.

Preferred resins for films include polyolefins such as polyethylene, polyimides, polyamides, polyesters and PEEK. Well known films particularly useful in the present invention are MYLAR® polyester films and KAPTON® polyimide films. As these films, without a thermally conductive filler, exhibit poor thermal conductivities, the additional of titanium diboride alone or in combination with one or more thermally conductive fillers, especially boron nitride or aluminum oxide, increases the thermal properties of the film dramatically, while causing little or not effect to the film's physical properties.

When the thermally conductive material is in the form of a tape or an adhesive, it is preferably formed of a pressure sensitive adhesive material, such as a silicone, urethane or an acrylic adhesive resin and titanium diboride, alone or in combination with one or more additional thermally conductive fillers. Such resins are well known and commercially available. See U.S. Pat No. 5,213,868 which is incorporated by reference in its entirety.

The tape is typically formed by coating the composition containing the filler and resin onto a releasable surface and dried or cured to form a form stable material. If desired, a releasable coversheet may be applied to one or both sides of the tape to keep it from prematurely sticking to a surface, to allow it to be rolled up on itself and/or to keep it from picking up dirt, dust and often debris which could interfere with the thermal capabilities of the tape in use.

When the thermally conductive material is in the form of a grease, it is preferably formed of an uncrosslinked silicone oil containing titanium diboride as a thermally conductive filler.

If desired in the elastomer or tape configuration, one may incorporate one or more layers of a support material to increase the toughness, resistance to elongation and tearing and other mistreatment of the thermally conductive material. The incorporation of support materials is particularly desired where mechanical strength needs to be improved. Any tearing or penetration of the thermally conductive material allow for the formation of a pocket of air, which as described above is poor thermal conductor. These air pockets can lead to localized hot spots and an overall decline in thermal performance.

The support material should not adversely interfere with the thermal conductivity of the thermally conductive material. Preferably, the support material is itself thermally conductive.

Examples of reinforcing materials useful in the present invention include, but are not limited, to glass fiber, mesh or cloth, plastic fiber, mesh cloth or films and metal fiber, mesh, cloth or foils.

The glass cloth may be woven or unwoven.

The plastic support material is preferably a mesh material, or a film. If a film, it may be solid or foraminous. Examples of suitable plastics include nylons, polyesters, polamides, polyimides, polyethylenes, or PEEK. Well-known plastic films particularly useful in the present invention are MYLAR® polyester films and KAPTON® polyimide films. As plastic films generally exhibit poor thermal conductivity properties, it is desirable to use a film which contains a thermally conductive filler. One such filler film is KAPTON MT®, a polyimide film which contains either an aluminum oxide or boron nitride filler. This material exhibits twice the thermal conductivity of an equivalent unfilled film. Alternatively, one may use a very thin film layer so as to minimize its effects on the thermal transfer.

Metal mesh cloths or foils are the preferred support material due to their high thermal conductivity. Examples of preferred metals useful as a mesh cloth or a foil, include but are not limited to, aluminum, copper, silver, iron, tinned copper, MONEL or FERREX® metal. Regardless of the support material used, it should be as thin as practicable while still providing the desired support.

The support materials may be embedded in the thermally conductive material or coated, calendered or attached to one surface of the thermally conductive material. Preferably, the support material and thermally conductive material are formed into a laminate of three or more layers with the support layer being the center layer and the thermally conductive material forming the outer layers.

The thermally conductive filler comprises titanium diboride ($TiB_2$). Other thermally conductive fillers may be used in conjunction with the titanium diboride, however, compositions having titanium diboride as the only thermally conductive filler are preferred. The filler preferably has an average diameter of about 2–50 microns (smaller diameters in this range are more preferred) and may be in any form such as particles, spheres and/or platelets. If desired, one may use a range of particle sizes to achieve higher loadings. The filler may be obtained commercially or may be formed by any known process.

The proportion of $TiB_2$ filler in the filled composition may vary depending on factors such as the desired thermal conductivity, the degree of electrical isolation and the degrees of elasticity desired, etc. Generally, the thermal conductivity increases with the proportion of filler in the composition. Preferably, the composition contains at least about 60 wt. % filler more preferably at least about 70 wt. % filler. Alternatively, the titanium diboride constitutes from about 10 to about 60 volume % of the composition, preferably from about 40 to about 70 volume %. The balance of the composition is formed by the resin and any auxiliary materials (e.g. catalysts, residual solvents, plasticizers, other fillers, etc.) Any appropriate conventional additives may be incorporated into the composition.

The thermal materials may be formed by any conventional method in any conventional shape. The methods all involve the formation of an initial mixture of resin and $TiB_2$ filler, which then can be formed into a sheet film or tape or placed in a mold, dried and/or cured.

One method of forming the material is to combine the resin binder with the selected filler or fillers and thoroughly mix the ingredients while slowly adding a solvent until a liquid having a smooth texture is achieved. The material is then cast onto a release sheet such as a piece of glass, MYLAR® film or coated paper, or on to a support layer and heated to drive off the solvent and form the thermally conductive material.

An alternative method is to thoroughly mix the ingredients together with a sufficient amount of solvent to obtain a thin liquid. The liquid can then be sprayed or coated onto a surface such as a release sheet or a reinforcing material such as a glass fiber cloth, a KAPTON® film or metal foil and heated to cure. Additionally, the same liquid formulation may have a porous support material, such as a glass fiber mesh, dipped into it to form the desired coating.

A further method of forming a heat conductive material of the present invention is by extrusion. The resin is reduced molten and the filler and other ingredients, if any, are added to the melt stream and intimately mixed with the resin. The molten mixture is then extruded, as a flat sheet on a tube which can be expanded and slit to form a thin film, as is well known in the art.

Another method of forming the heat conductive material of the present invention is by molding. This is particularly useful when one wishes to form a substantially thick heat conductive layer or when one wishes to form a specially shaped heat conductive material such as an elastomeric pad. In molding the heat conductive material, the components are mixed with a solvent and poured into a prefabricated mold may coat the inside of the mold with a release coating before adding the components. The mold is then heated or otherwise subjected to an external energy field to form the molded shape. Instead of using a separate mold, it may be desired to use a mold which allows the heat conductive material to be molded in place directly to one of the surfaces it will contact.

A preferred method is to form a laminated material of three or more layers in which the center layer is formed of a support layer discussed above, such as glass mesh, plastic film or metal foil and an outer layer of the thermally conductive material is bonded on each side of the support layer and interpenetrating it so as to form a cohesive laminated material. The bonding may occur sequentially so that one side of the support layer is covered and cured and then the process is repeated on the opposite side. Preferably, the outer layers are applied to both sides simultaneously. If desired, all three layers may contain titanium diboride as the primary thermally conductive filler.

Where it is desired to have the thermal interface material provide electrical isolation as well as thermal conductivity, it is possible to do so, even with the electrically conductive titanium diboride filler when one forms a laminate of two outer layers containing titanium diboride and a center layer of thermally conductive, electrically insulative material such as a filled film, such as KAPTON® MT film. In order to ensure that no arcing or flash around occurs between the two isolated conductive layers, the middle layer should be of a width and length that is greater than that of the two outer layers. Preferably, it has a width and length that is at least 5%, more preferably 10% greater than that of the outer layers. This prevents such arcing from occuring due to the long length of dielectric surface over which the electrical energy would have to travel. For example, a square piece of the product according to this embodiment would preferably have two layers containing titanium diboride filler of 1 inch by 1 inch and middle dielectric layer, such as of KAPTON® MT film of 1.1 inch by 1.1 inch.

The invention is further illustrated by the following example. The invention is not limited to the materials, process steps or results given in the examples below.

EXAMPLE

A thermally conductive material according to the present invention was made as follows:

1.) A mixture of 10 grams isopropyl alcohol and 40 grams of a solvent (toluene) was prepared and to which as added a silane coupling agent in an amount equal to 1% by weight of the thermal filler to be added. A small amount of deionized water was then added to prehydrolize the silane.

2.) Titanium diboride (43.20 grams) was added and mixed for about 30 minutes to form a slurry.

3.) The slurry was mixed with 36 grams of acrylic resin dissolved in toluene solvent. The slurry was then mixed under high shear conditions for 60 minutes and then degassed.

4.) The slurry was knife coated onto a release film in a thickness of 13 mils and dried in a hot air convection oven to drive off the solvent and then cured in the same oven at a temperature of 125% for 5 minutes. The coated release films were then laminated to both sides of mil 1100 aluminum foil.

The product was then tested for thermal conductivity at levels of 0 psi and at 300 psi with the following results:

| | |
|---|---|
| 0 psi: 0.60 | Units are W/m-K |
| 300 psi: 0.72 | Units are W/m-K |

As a comparison, the same product was made using 21.6 grams of boron nitride (21 volume % filler, same as the present example) and tested for thermal conductivity at 0 and 300 psi with the following results:

0 psi: 0.33 units are in W/m-K 300 psi: 0.61 units are in W/m-K

As can be clearly seen, the titanium diboride filler provided significantly higher thermal conductivity at 0 psi as compared to the boron nitride filler and better apparent thermal conductivity properties at 300 psi than the boron nitride filler example.

What we claim:

1. A thermally conductive of pressure sensitive adhesive tape having both thermal conductance and adhesion, said thermally conductive, pressure sensitive adhesive tape comprising a combination including a pressure sensitive adhesive resin binder and titanium diboride particles distributed throughout the pressure sensitive adhesive resin binder.

2. A thermally conductive tape according to claim 1, wherein said combination is at least 60% titanium diboride by weight.

3. A thermally conductive tape according to claim 1, wherein said combination is at least 70% titanium diboride by weight.

4. A thermally conductive tape according to claim 1, wherein said combination, is from about 10% to about 60% titanium diboride by weight.

5. A thermally conductive tape according to claim 1, wherein said combination is from about 40% to about 70% titanium diboride by weight.

6. A thermally conductive tape according to claim 1, further comprising additional thermally conductive filler particles selected from the group consisting of alumina, boron nitride, magnesia, graphite, aluminum nitride and mixtures thereof.

7. A thermally conductive tape according to claim 1, wherein said resin binder is an acrylic resin.

8. A thermally conductive tape according to claim 1, further comprising an electrically insulating and thermally conducting layer of material overlaying said tape and a further layer of said tape overlaying the layer of electrically insulating and thermally conducting material to form a three layer laminate.

9. A thermally conductive tape according to claim 1, wherein said adhesive resin binder is an acrylic resin and said tape further comprises a metal mesh support layer.

10. A thermally conductive tape in according to claim 9, wherein said titanium diboride is present in sufficient amount to impart electrical conductivity to said tape.

11. The tape according to claim 1, wherein said pressure sensitive adhesive resin binder is selected from the group consisting of silicone resins, urethane resins and acrylic resins.

12. A thermally conductive pressure sensitive adhesive tape, comprising at least one layer of a pressure sensitive adhesive resin binder containing titanium diboride particles distributed throughout the pressure sensitive adhesive resin binder and at least one thermally conductive support layer to increase the mechanical strength of the tape.

13. A thermally conductive tape according to claim 12, wherein said at least one support layer is selected from the group consisting of thermally conductive plastic films or meshes, thermally conductive filled polymer films or meshes, metals and glass materials.

14. A thermally conductive tape according to claim 13, wherein said support layer is selected from the group consisting of metal meshes, metal cloths and metal foils.

15. A thermally conductive tape according to claim 13, wherein said support layer is selected from the group consisting of glass fibers, glass meshes and glass cloths.

16. A thermally conductive tape according to claim 12, wherein said support layer is coated, calendared or attached to one surface of the tape.

17. A thermally conductive tape according to claim 12, wherein said support layer is embedded within the tape.

18. A thermally conductive tape according to claims 17, wherein said support layer is comprised of electrically insulating material.

19. A thermally conductive tape according to claim 18, wherein said support layer is comprised of a filled polymer.

20. The tape according to claim 12, wherein said pressure sensitive adhesive resin binder is selected from the group consisting of silicone resins, urethane resins and acrylic resins.

* * * * *